Figure 2:
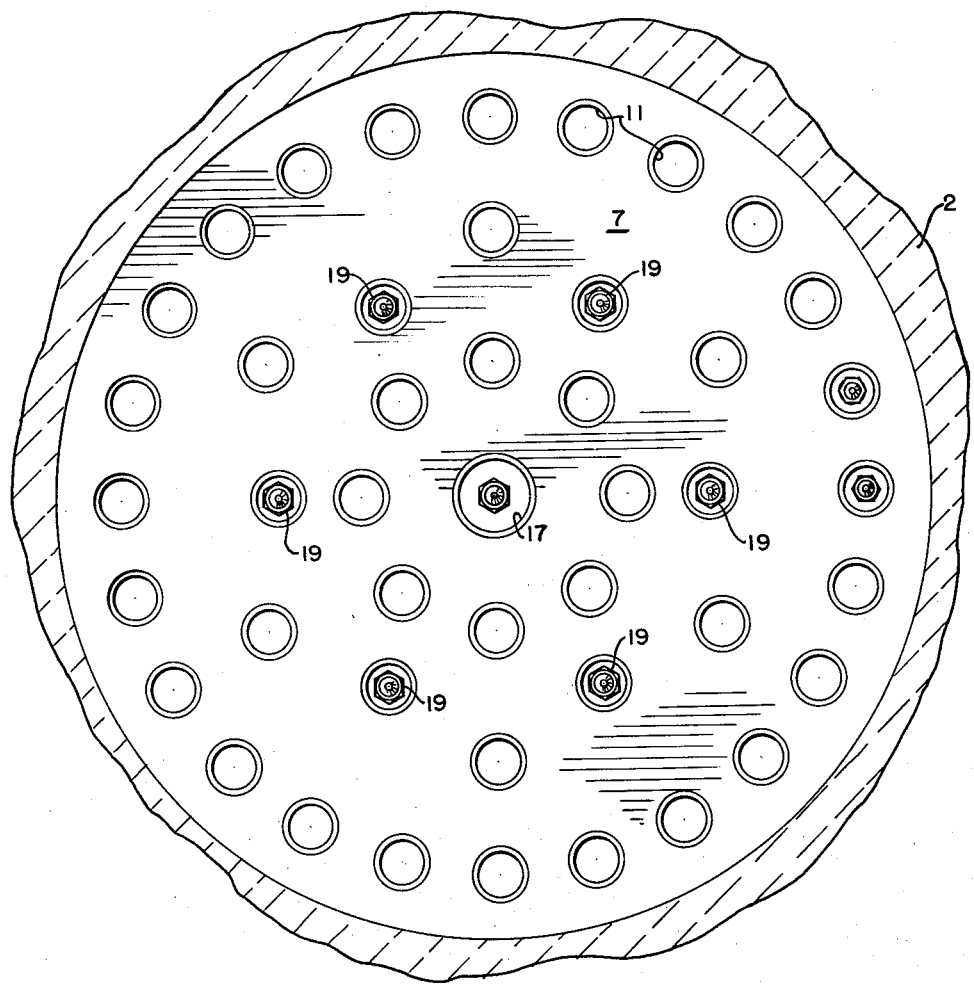

April 18, 1961  R. H. HAVARD  2,980,511
CARBON BLACK MANUFACTURE
Filed Jan. 28, 1959  2 Sheets-Sheet 1

FIG. I

INVENTOR
ROBERT H. HAVARD
BY Pennie, Edmonds,
Morton, Barrows & Taylor.
ATTORNEYS

2,980,511
CARBON BLACK MANUFACTURE

Robert H. Havard, Eola, La., assignor to Columbian Carbon Company, New York, N.Y., a corporation of Delaware Filed Jan. 28, 1959, Ser. No. 789,580
9 Claims. (Cl. 23—209.4)

The present invention relates to the production of carbon black by the decomposition of hydrocarbons and relates more particularly to improvements in processes of the type in which a combustible mixture of a fluid fuel and an oxygen-containing gas, advantageously air, is blasted longitudinally into one end of an elongated, unobstructed heat-insulated chamber and is burned therein to form a violently turbulent stream of hot blast flame gases passing longitudinally through the chamber and the hydrocarbon to be decomposed, herein sometimes referred to as hydrocarbon make, is separately injected into the hot blast gas stream and is decomposed to carbon black by heat absorbed from the hot gases.

In the Wiegand and Braendle Patent 2,499,438, for instance, there is disclosed and claimed as a process of the type just described wherein the combustible mixture is blasted into the chamber as a plurality of streams uniformly spaced over the cross-sectional area of the chamber and the hydrocarbon make is separately and forcefully injected into the resultant stream of hot blast flame gases adjacent the said end of the chamber and in a direction substantially parallel to the longitudinal axis of the chamber and concurrent with the direction of flow of the hot blast flame gases through the chamber, the thus injected stream of hydrocarbon make being uniformly positioned between, and flanked on all sides by, the entering streams of the combustible mixture.

The present invention provides an improvement in processes of the type described in said patent whereby the fineness of subdivision of the resultant carbon black may be controlled without sacrifice in the production rate of a particular apparatus and without sacrifice in yield of the carbon black per gallon of hydrocarbon make.

In conventionally used processes for the manufacture of carbon black, when it has been desired to reduce the particle size of the carbon black, it has generally been necessary to lower the oil load i.e., the rate at which the oil is charged to a furnace of some fixed dimensions. This decrease in oil load or charging rate has not only resulted in a decrease in carbon black production rate but has also resulted in a lower yield of carbon black per gallon of oil charged to the furnace.

Though variation in oil charging rate has heretofore been a useful expedient in controlling the particle size of the carbon black, it has been found effective only within limits and frequently the decrease in yield has been too great for the operation to be economically feasible.

It is then an object of the present invention, as noted above, to provide a method and means whereby the particle size of a carbon black produced from a liquid hydrocarbon may be substantially reduced without sacrifice in yield and without reduction in the charging rate, and consequent production rate, for a given apparatus.

This object and other advantages, as will hereinafter appear, are attained in accordance with my present invention by the separate injection of steam into the hot gas mixture passing through the furnace chamber at a zone downstream from the zone of introduction of the hydrocarbon make, and wherein the decomposition of the hydrocarbon is initiated, or just prior to or immediately following the last said zone.

A further advantage of this separate injecting of steam into the reaction chamber, in accordance with the present invention, is a marked lowering of the staining properties of the resultant carbon black.

Carbon blacks normally produced from a high molecular weight hydrocarbon oil make by processes of the type to which the present invention relates may be characterized as fast extruding furnace blacks, frequently designated FEF blacks. They are of particular utility in the compounding of rubber composition for making extruded rubber products such as, for instance, refrigerator gaskets where non-staining properties are of extreme importance. However, the blacks so produced frequently have objectionably high stain properties.

It was to be expected that the injecting of steam into the furnace chamber, because of the consequent lowering of furnace temperature, would result in a carbon black product having still higher staining properties. Quite surprisingly, the reverse was found to be true where the steam is injected in accordance with my present invention.

It has heretofore been proposed, in operations of the type with which we are here concerned, to inject the liquid hydrocarbon make into the furnace chamber as a gas-atomized liquid spray, using high pressure steam as the atomizing gas, for the purpose of dispersing the liquid in the most minute particles possible. However, to my knowledge, it has not heretofore been proposed to separately inject steam into the preformed mixture of hot combustion gases and hydrocarbon make, independently of the atomizing fluid.

The staining characteristics of the carbon black are primarily indicative of the amount and type of extractable material remaining in the finished carbon black. This oil extractable material is normally decreased by increased reaction temperatures and by increased contact time between the carbon black and the hot furnace gases, but is normally increased by an increase in oil load. Since the steam injected in accordance with the present invention is at a temperature much lower than that of the hot gaseous mixture into which it is injected, a lowering of the reaction temperature would be expected which, in turn, would be expected to result in an increase in particle dimension and an increase in oil extractable material in the product. Further, the increase in gas volume due to the adding of steam would tend to shorten contact time, which also would be expected to increase the oil extractable.

It is, therefore, a most surprising fact that the proportion of oil extractable remaining in the carbon black product, and consequently the staining characteristic of the carbon black, is markedly decreased by my injection of steam. A further surprising result is that this may be accomplished without decrease in oil charging rate and that the fineness of the resultant black can also thereby be controlled and varied over a wide range of furnace loads.

In accordance with my invention, the steam is most advantageously injected into the hot mixture of blast flame gases and hydrocarbon make as expanding high velocity jets uniformly spaced about the periphery of the furnace chamber. By this means, the entering steam is rapidly, uniformly mixed with the hot furnace gases. Also, the entering high velocity steam jets cause an increased turbulence of the hot gases in the zone of the steam injection. However, other means of injecting the steam which accomplish these results may be used, for instance open-ended pipes of such cross-sectional dimension as to give the desired high velocity to the entering steam.

The entering velocity of the steam is subject to considerable variation depending upon the desired fineness of the carbon black product. It has been found, however, that for a given furnace load, an increase in the velocity of the entering steam jets tends to cause a reduction in particle size of the carbon black. Optimum steam jet velocities will depend upon other operating conditions, such as the velocity of the blast gas mixture passing through the chamber, the diameter of the chamber, relative oil charging rates and the like. Further, the entering steam jet velocities cannot be accurately measured under conditions of operation. Therefore, it is difficult, if not impossible, to assign numerical values to these velocities, but the optimum velocities under given operating conditions may be readily determined by simple tests.

As previously noted, this steam is separately injected into a zone of the reaction chamber downstream from that in which the initial mixing of the hydrocabon make with the blast flame gases is effected but upstream from the zone where carbon black particles are formed in the furnace gases. In other words, the steam must be injected into that zone of the furnace chamber in which the primary decomposition reaction is taking place, more advantageously at the zone where the decomposition is initiated or immediately preceding or following that zone.

The proportion of steam thus introduced is like-wise subject to considerable variation depending upon other operating conditions, such as previously noted, as well as the desired characteristics of the finished product. The quantity of steam introduced will be controlled by steam pressure and the size of the exit nozzle, which factors will also influence the initial velocity of the steam jets. Consequently, one can only theorize as to whether steam velocity or quantity of steam is the controlling factor. But, as previously noted, in view of my present disclosure, optimum conditions for producing the desired results may be readily determined by simple tests.

I cannot presently account for the results obtained in accordance with my present invention. It might be supposed that the steam serves as a diluent further to dilute the hydrocarbon make prior to decomposition to carbon black. It might also be suggested that the function of the steam is that of increasing turbulence of the hot gaseous mixture in the furnace chamber. However, neither of these suppositions would account for the unusual results obtained. It seems more likely that these unexpected results are due to a combination of conditions, probably including some partial pressure effect at some critical stage of the reaction not obtained by steam when introduced as the atomizing gas.

The process of my invention will be more fully describe and illustrated with reference to the accompanying drawings which represent apparatus especially adapted to the carrying out of the process and of which:

Fig. 1 is a vertical sectional view of the carbon black furnace and certain auxiliary apparatus, and Fig. 2 is a transverse vertical section along the line 2—2 of Fig. 1.

The elongated, cylindrical, unobstructed furnace chamber 1 is enclosed within an inner cylindrical side wall 2 of furnace refractory, covered by a layer of fire brick 3 and a layer of heat-insulating material 4, all encased in a metal jacket indicated at 5.

The downstream end of chamber 1 opens into a primary vertical cooler, fragmentarily represented at 6, of conventional design.

The upstream end of the furnace chamber is closed by a cylindrical burner block 7 of suitable refractory material, an enlarged view of the inner face of this burner block being shown by Fig. 2.

This burner block is designed to fit snugly into the upstream end of the furnace chamber and its outer face is enclosed by a wind box 8 secured to the furnace jacket 5 by angles 9. Air for combustion of the fluid fuel is passed under pressure to the wind box through air duct 10 from any suitable source, not shown.

A multiplicity of burner ports 11, extending longitudinally through the burner block, are uniformly and symmetrically spaced over the face of the block, as more clearly shown in Fig. 2. The outer end of each port is fitted with a liner tube 12, flared outwardly at its outer end, and coaxially positioned at the entrance to each of the tubes 12 is a fuel injection tube 13 tipped by a spud 14. The fuel tubes 13 are connected at their outer ends to a manifold 15 to which the gaseous fuel is supplied through conduits 16.

Similar ports 17 for the injection of the hydrocarbon make extend longitudinally through the burner block and are symmetrically spaced over the face of the burner block, each of said ports 12 being flanked on all sides by burner ports as more clearly shown in Fig. 2.

Into the outer end of each port 17, there is sealed a spray assembly 18 having a spray nozzle 19, adjacent the inner end of the port, connected to tube 20 for supplying a dispersion of the hydrocarbon make and an atomizing gas to the nozzle 19.

The respective tubes 20 extend outwardly through the wind box through an assembly jacket 21. The respective jackets 21 are sealed at 22 to the face plate 23 of the burner block, to which tubes 12 are also sealed, and are sealed in the outer end wall of the wind box at 24. The respective tubes 20 are adjustably supported in jackets 21 by outer flanges 25 so that they may be moved longitudinally through the jackets for the purpose of adjusting the position of spray nozzles 19 with respect to the downstream face of the burner block.

The spray assemblies represented at 18 may be of any suitable two-fluid type. For instance, they may be of the type in which the hydrocarbon make and the atomizing gas steam for instance, are separately passed directly to a mixing and atomizing nozzle. In the type represented in the drawing, each spray assembly is provided with a mixer indicated at 26 to which the oil and steam are separately supplied by so constructing the outer end of tube 20 as to provide an inner tubular conduit for the oil and an outer annular conduit for the atomizing gas, the flow being regulated and controlled by valve means represented at 27 to which oil is supplied through line 28 and the steam is supplied through line 29.

In the apparatus represented in the drawings, the separately introduced steam is injected into the hot furnace-gas mixture by means of four injectors 30 symmetrically positioned about the periphery of the furnace chamber and each extending through a side-wall port 31. These assemblies comprise a steam conduit 32 tipped by a spray nozzle 33 and adjustably supported at its outer end by a sleeve 34 secured to the casing 5 by any suitable means. Steam conduits 32 enter the sleeve 34 through a packing gland 35 and tube 32 is held in the adjusted position by the set screw 36. Steam under pressure is supplied from any suitable source to the outer ends of tubes 32.

In Fig. 1 of the drawings, the steam injectors 30 are shown as entering the furnace chamber at an angle of about 60° with the longitudinal axis of the furnace chamber. Though highly advantageous results have been obtained with the steam injector so positioned, these injectors may enter the furnace chamber radially. Generally, the injection of the steam at an angle less than about 45° with the longitudinal axis of the chamber is not recommended.

As previously noted, the separately introduced steam may be injected into the furnace chamber by other means, provided that steam enters the chamber at sufficient velocity to insure rapid uniform mixing of the steam with the furnace-gas mixture. For this purpose, I have, for instance used spray assemblies such as represented at 18 but passing only steam to the nozzle.

My present process and the effectiveness thereof will be further illustrated by the following specific examples:

EXAMPLE I

Two separate runs were made in apparatus substantially as represented in the drawings. In each of these runs, air for combustion was charged to the furnace chamber at the rate of 125,000 cubic feet per hour and natural gas was supplied, as the fuel gas, at a rate to provide an air/gas ratio of 12.6. In each of these runs, a liquid hydrocarbon make was charged to the chamber at a rate of 200 gallons per hour, atomized by steam at a temperature of 550° F. and under a pressure of 95 pounds per square inch. In the first of these runs, steam at a temperature of 550° F. under pressure of 95 pounds per square inch was separately introduced into the furnace chamber through two diametrically opposite steam injector nozzles, substantially as shown in the drawings, in accordance with the present invention. For comparative purposes, no steam was separately introduced in the second run. The characteristics and yields of the carbon blacks produced by the respective runs are set forth in the following tabulation:

Table 1

| Run No | 1 | 2 |
|---|---|---|
| Tinting Strength (Percent Standard F.F. Carbon Black) | 71 | 63 |
| Oil Absorption, Gallons per 100 Pounds | 19 | 19 |
| Yield, Pounds per Gallon | 5.26 | 5.23 |

EXAMPLE II

In each of two further runs in apparatus of the type shown, air for combustion was charged to the furnace chamber at the rate of 430,000 cubic feet per hour and the air-fuel gas ratio was 12.9. A hydrocarbon oil make was charged to the furnace chamber at a rate of 560 gallons per hour atomized by steam at a temperature of 550° F. and under a pressure of 95 pounds per square inch. In the first of these runs, steam at the temperature and pressure just indicated was separately introduced into the furnace chamber in accordance with the present invention as four symmetrically positioned spray jets. In the second run, for comparative purposes, no steam was separately introduced into the chamber. The characteristic of the carbon black and the yields thereof in the respective runs were as follows:

Table 2

| Runs | 1 | 2 |
|---|---|---|
| Tinting Strength (Percent Standard F.F. Carbon Black) | 75 | 69 |
| Oil Absorption, Gallons per 100 Pounds | 18.3 | 18.7 |
| Yield, Pounds per Gallon | 5.26 | 5.23 |

It will be observed that in each of the foregoing examples the separate introduction of steam, in accordance with the present invention, resulted in a substantial increase in tinting strength of the carbon black, an indication of decreased particle size, without substantial change in yield or oil absorption characteristics.

EXAMPLE III

In two additional runs in apparatus such as used in the preceding examples, air for combustion was charged to the furnace chamber at the rate of 250,000 cubic feet per hour, the air-fuel gas ratio being 12.3. A liquid hydrocarbon make was charged to the operation in each run at a rate of 300 gallons per hour atomized by steam at a temperature of 550° F. and under pressure of 85 pounds per square inch. In each of these runs, steam at a temperature of 550° F. was separately introduced in the furnace chamber through four symmetrically positioned spray nozzles as in Example II. In the first of these runs, the steam was supplied at a pressure of 50 pounds per square inch and in the second run the steam pressure was 60 pounds per square inch. The characteristics of the carbon blacks produced in the respective runs and the yield thereof are set forth in the following table:

Table 3

| | Run 1 | Run 2 |
|---|---|---|
| Tinting Strength (Percent Standard F.F. Carbon Black) | 70 | 74 |
| Oil Absorption, Gallons per 100 Pounds | 18.4 | 18.5 |
| Yield, Pounds per Gallon | 4.90 | 4.87 |

The hydrocarbon oil make used in each of the foregoing specific examples was a highly aromatic petroleum residue having approximately the following analysis:

Viscosity, SSU, ° F.:
   100 _____ 545
   130 _____ 180
   210 _____ 47
API gravity _____ 0.5
Ash _____ .033
Sulfur _____ 1.78
Percent Ramsbottom carbon residue _____ 11.85
Mol. wt. _____ 256

It will be understood, however, that the invention is not restricted to hydrocarbons of the type just indicated but is applicable to all hydrocarbon oils, whether of an aromatic or a paraffinic nature.

The injectors used in the foregoing examples for the separate introduction of steam were of the conventional type spray nozzle known to the industry by the trade name SAR #2 and marketed by National Airol Burner Company, of Philadelphia, Pennsylvania, equipped with a nozzle tip having a single, coaxial, circular orifice of 0.1104 square inch. However, in their use, only the steam was supplied to the nozzle.

Though the rate at which the steam is thus separately supplied cannot be precisely measured, it can be estimated from the steam temperature and pressure and the characteristics of the spray nozzles used. Similarly, though the steam jet velocity and the resultant turbulence and dilution cannot be precisely measured, they may likewise be appraised from calculated mass ratios and mass velocity ratios of the steam and furnace gases. The results of such calculations are set forth in the following tabulation:

| Example | I | II | III | |
|---|---|---|---|---|
| Run No | 1 | 1 | 1 | 2 |
| Separate Steam: | | | | |
|   Per Spray, Lbs./Hr | 113 | 113 | 66.3 | 76.7 |
|   Per Furnace, Lbs./Hr | 226 | 452 | 265.2 | 306.8 |
| Mass Velocity Ratios, Steam:Furnace Gases | 60.3 | 18.1 | 19.4 | 22.3 |

I have found that the proportion of separately injected steam, determined as indicated above, should more advantageously fall within a range of 0.5% to 5%, preferably of the order of 1-2%, based on the total weight of combustion components and separately injected steam.

The furnace chamber of the apparatus used in carrying out the operation of the preceding examples was approximately 30 inches in diameter and approximately 15 feet long, i.e. 15 feet from the inner face of the burner block to the exit opening into the cooler, and the separately introduced steam, when used, was injected into a zone of the furnace chamber about 2–2½ feet from the inner face of the burner block. It will be understood, however, that the optimum position of the zone of separate steam injection will vary somewhat depending upon other operating conditions, such as furnace velocities, furnace temperatures, type of charging stock and the like, but can readily be determined by simple tests in the light of the foregoing disclosure. As a further guide, it has usually been found that said steam should be injected into a zone of the furnace chamber approximately ⅛ the distance from the inner face of the burner block to the precooler.

I claim:

1. In the process for producing carbon black by the decomposition of a liquid hydrocarbon wherein a combustible mixture of a fluid fuel and an oxidizing gas is blasted into one end of an elongated, unobstructed, heat-insulated reaction chamber as a multiplicity of streams uniformly spaced over the cross-sectional area of the chamber and said combustible mixture is burned as it enters the chamber to form a violently turbulent stream of hot blast flame gases passing longitudinally through the chamber and the hydrocarbon to be decomposed is separately injected longitudinally into the resultant stream of hot gases adjacent the said end of the chamber as a plurality of gas-atomized liquid sprays symmetrically positioned over the cross-sectional area of the chamber between, and flanked on all sides by, the entering streams of combustible mixture whereby the hydrocarbon to be decomposed is rapidly, uniformly mixed with the hot blast flame gases and is decomposed by heat absorbed from said gases to form carbon black in suspension, the improvement which comprises the step of separately introducing steam into the furnace chamber and rapidly, uniformly mixing the steam with the preformed mixture of hot furnace gases and hydrocarbon to be decomposed in a zone of the chamber preceding that in which the carbon black particles are formed.

2. The process of claim 1 in which the steam is separately introduced into that zone of the chamber wherein decomposition of the hydrocarbon is initiated.

3. The process of claim 1 in which the steam is separately introduced into that zone of the chamber just upstream from that wherein decomposition of the hydrocarbon is initiated.

4. The process of claim 1 in which the steam is separately introduced into that zone of the chamber immediately downstream from that wherein decomposition of the hydrocarbon is initiated.

5. The process of claim 1 in which the steam is introduced as expanding high velocity jets.

6. The process of claim 5 in which the steam jets are symmetrically positioned about the periphery of the chamber.

7. The process of claim 1 in which the steam is injected radially into the chamber.

8. The process of claim 1 in which the angle of injection of the steam into the chamber is within the range of 45° to 90° from the upstream extension of the longitudinal axis of the chamber.

9. The process of claim 8 in which the angle of steam injection is about 60°.

References Cited in the file of this patent

UNITED STATES PATENTS

| | | |
|---|---|---|
| 2,617,714 | Arnold | Nov. 11, 1952 |
| 2,672,402 | Stokes | Mar. 16, 1954 |
| 2,682,450 | Sweigart et al. | June 29, 1954 |